United States Patent
Chua et al.

(10) Patent No.: US 9,967,465 B2
(45) Date of Patent: May 8, 2018

(54) IMAGE FRAME PROCESSING METHOD

(71) Applicant: Realtek Singapore PTE LTD, Singapore (SG)

(72) Inventors: Tien Ping Chua, Singapore (SG); Chen Feng Kuo, Hsinchu (TW)

(73) Assignee: Realtek Singapore PTE LTD, Singapore (SG)

( * ) Notice: Subject to any disclaimer, the term of this patent is extended or adjusted under 35 U.S.C. 154(b) by 75 days.

(21) Appl. No.: 15/200,946

(22) Filed: Jul. 1, 2016

(65) Prior Publication Data
US 2017/0339345 A1  Nov. 23, 2017

Related U.S. Application Data

(63) Continuation-in-part of application No. 15/158,247, filed on May 18, 2016.

(51) Int. Cl.
*G06T 1/20* (2006.01)
*G06T 7/207* (2017.01)
(Continued)

(52) U.S. Cl.
CPC ........... *H04N 5/23267* (2013.01); *G06T 1/20* (2013.01); *G06T 7/207* (2017.01);
(Continued)

(58) Field of Classification Search
CPC ........... H04N 5/23235; H04N 5/23254; H04N 5/23267; H04N 19/137; H04N 19/172; H04N 19/42; G06T 1/20; G06T 7/207
See application file for complete search history.

(56) References Cited

U.S. PATENT DOCUMENTS 5,010,401 A    4/1991  Murakami et al.
5,282,255 A *  1/1994  Bovik ................ H04N 19/94
                                             375/240.01
(Continued)

FOREIGN PATENT DOCUMENTS

TW    201009566 A1    3/2010
TW    201427431 A     7/2014

OTHER PUBLICATIONS

Report of EETimes, "Mobile video: ARM vs. DSP vs. hardware", published on http://www.eetimes.com/document.asp?doc_id=1275550.
(Continued)

*Primary Examiner* — Yubin Hung
(74) *Attorney, Agent, or Firm* — McClure, Qualey & Rodack, LLP

(57) ABSTRACT

The present disclosure discloses an image frame processing method for processing a plurality of input image frames with an image processing device. An embodiment of the method comprises: receiving a plurality of input image frames; and processing the plurality of input image frames to produce a first number of first output image frames and a second number of second output image frames, in which the resolution of the first output image frames is higher than the resolution of the second output image frames and the first number is less than the second number, wherein a first frame of the first output image frames and a second frame of the second output image frames are derived from the same one of the plurality of input image frames.

20 Claims, 8 Drawing Sheets

(51) Int. Cl.
*H04N 19/42* (2014.01)
*H04N 5/232* (2006.01)
*H04N 19/137* (2014.01)
*H04N 19/172* (2014.01)
*H04N 19/503* (2014.01)

(52) U.S. Cl.
CPC ..... *H04N 5/23235* (2013.01); *H04N 5/23254* (2013.01); *H04N 19/137* (2014.11); *H04N 19/172* (2014.11); *H04N 19/42* (2014.11); *H04N 19/503* (2014.11)

(56) References Cited

U.S. PATENT DOCUMENTS

| | | | |
|---|---|---|---|
| 5,357,281 A * | 10/1994 | Ikeda | H04N 5/232 348/14.1 |
| 7,139,003 B1 | 11/2006 | Kirk et al. | |
| 7,859,574 B1 | 12/2010 | Alvarez et al. | |
| 8,289,401 B2 * | 10/2012 | Pinto | H04N 5/145 348/208.1 |
| 8,699,569 B2 | 4/2014 | Muraki et al. | |
| 8,948,822 B2 | 2/2015 | Raveendran | |
| 2003/0123696 A1 * | 7/2003 | Matsumoto | H04N 1/00867 382/100 |
| 2004/0161158 A1 | 8/2004 | Kondo et al. | |
| 2007/0104377 A1 | 5/2007 | Fukui | |
| 2007/0196996 A1 * | 8/2007 | Han | H01L 21/76232 438/424 |
| 2012/0213448 A1 | 8/2012 | Malmborg et al. | |
| 2013/0222619 A1 * | 8/2013 | Lin | H04N 5/23254 348/208.1 |
| 2014/0037005 A1 | 2/2014 | Lee et al. | |
| 2014/0126626 A1 | 5/2014 | Matcha et al. | |
| 2014/0161367 A1 | 6/2014 | Ridenour et al. | |
| 2014/0369557 A1 * | 12/2014 | Kayombya | G06K 9/00624 382/103 |
| 2015/0016748 A1 * | 1/2015 | Ko | G06T 1/20 382/299 |
| 2015/0312572 A1 | 10/2015 | Owen | |
| 2016/0014421 A1 | 1/2016 | Cote et al. | |
| 2017/0094300 A1 | 3/2017 | Chou et al. | |

OTHER PUBLICATIONS

TW Office Action dated Mar. 7, 2018 in Taiwan application (No. 105119345).
Search Report issued in TW Office Action dated Mar. 7, 2018 in Taiwan application (No. 105119345).
Zhang, et al.: "A Multilayer Model of Image Super-Resolution in the Presence of Inner-Frame Motion Outliers"; Proceedings of the Seventh International Conference on Machine Learning and Cybernetics, Kunming, Jul. 12-15, 2008; pp. 1-5.

* cited by examiner

IMAGE FRAME PROCESSING METHOD

BACKGROUND OF THE INVENTION

1. Field of the Invention

The present disclosure relates to image processing, especially to an image processing device, a video subsystem and a video pipeline.

2. Description of Related Art

As the design and manufacturing process of integrated circuits move on, more and more functions that used to be carried out by separated devices are integrated into one electronic device such as a smart phone, a tablet personal computer, etc. The photographic function (a.k.a. image/video capturing and encoding function), which might be the most popular one, is usually included in a multifunctional electronic device. However, since a multifunctional electronic device generally has one and only one application processor dealing with a lot of setting and control of different functions executed by software and/or hardware, the photographic function often has to wait for the response from the application processor after sending one or more interrupt(s) or request(s) to the application processor, which may degrade the performance of the photographic function, consume too much resources of the application processor and reduce user experience.

People who are interested in the related art may refer to the following documents:
(1) Report of EETimes, "Mobile video: ARM vs. DSP vs. hardware", published on http://www.eetimes.com/document.asp?doc_id=1275550.
(2) US patent, "Integrated camera image signal processor and video encoder", U.S. Pat. No. 7,859,574 B1.
(3) US patent, "Motion picture encoding device and method, motion picture decoding device and method, motion picture recording device, program, and data structure", U.S. Pat. No. 8,699,569 B2.

SUMMARY OF THE INVENTION

In consideration of the problem of the prior art, an object of the present disclosure is to provide an image processing device, a video subsystem and a video pipeline capable of making improvements over the prior art.

The present disclosure discloses an image processing device configured to process image raw data with an application processor and a video pipeline distinct from the application processor. An embodiment of the image processing device comprises: an application processor; a video pipeline interface unit; and a video pipeline. The application processor is operable to output at least a parameter and at least an instruction based on default or user setting to a video pipeline interface unit between the application processor and the video pipeline. The video pipeline interface unit includes a shared memory for storing the at least one parameter, and an inter-processor communication circuit for passing the at least one instruction to the video pipeline and reporting how the at least one instruction is treated by the video pipeline to the application processor. The video pipeline is operable to access the shared memory and process the image raw data according to the at least one parameter, and operable to carry out an operation indicated by the at least one instruction or refuse to execute the operation indicated by the at least one instruction.

The present disclosure also discloses a video subsystem. An embodiment of the video subsystem comprises: a video pipeline interface unit and a video pipeline. The video pipeline interface unit includes a shared memory for storing at least one parameter from a domain outside the video subsystem, and an inter-processor communication circuit for passing an instruction from the domain outside the video subsystem to a video pipeline and reporting how the at least one instruction is treated by the video pipeline to the domain outside the video subsystem. The video pipeline is operable to access the shared memory and process image raw data according to the at least one parameter, and carry out an operation indicated by the at least one instruction or refuse to execute the operation indicated by the at least one instruction.

The present disclosure further discloses a video pipeline. An embodiment of the video pipeline comprises: a video processor operable to output at least an image processing parameter and at least an encoding parameter according to one or both of at least one parameter and at least one instruction from a domain outside the video pipeline; an image signal processor operable to turn image raw data into lower resolution video data and higher resolution video data according to the at least one image processing parameter; a streaming conversion circuit operable to convert the higher resolution video data into converted data; and an encoder operable to encode the lower resolution video data and encode the converted data according to the at least one encoding parameter.

The present disclosure further discloses an image frame processing method for processing a plurality of input image frames with an image processing device. An embodiment of the method comprises: receiving a plurality of input image frames; and processing the plurality of input image frames to produce a first number of first output image frames and a second number of second output image frames, in which the resolution of the first output image frames is different from the resolution of the second output image frames and the first number is different from the second number, wherein a first frame of the first output image frames and a second frame of the second output image frames are derived from the same one of the plurality of input image frames.

The present disclosure further discloses an image frame processing method for processing a plurality of input image frames with a video pipeline. An embodiment of the method comprises: receiving the plurality of input image frames; processing the plurality of input image frames to produce a first number of first output image frames and a second number of second output image frames, in which the resolution of the first output image frames is different from the resolution of the second output image frames and the first number is different from the second number; and encoding a first frame of the first output image frames with a first part of encoding parameters and a second part of the encoding parameters and encoding a second frame of the second output image frames with the first part of the encoding parameters and a third part of the encoding parameters while the second part is different from the third part, wherein the first part of the encoding parameters is generated during the encoding of a preceding frame of the first output image frames.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this invention filed. If any term is defined in the specification, such term should be explained accordingly. Besides, the connection between objects or events in the disclosed embodiments can be direct or indirect provided that these embodiments are still applicable under such connection. Said "indirect" means that an intermediate object or a physical space is existed between the objects, or an intermediate event or a time interval is existed between the events. In addition, the following description relates to image processing, and the background knowledge thereof will be omitted here if such background knowledge has little to do with the features of the present invention. Furthermore, the shape, size, and ratio of any element and the step sequence of any flow chart in the disclosed figures are just exemplary for understanding, not for limiting the scope of this invention.

Each embodiment in the following description includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

Figure 1:
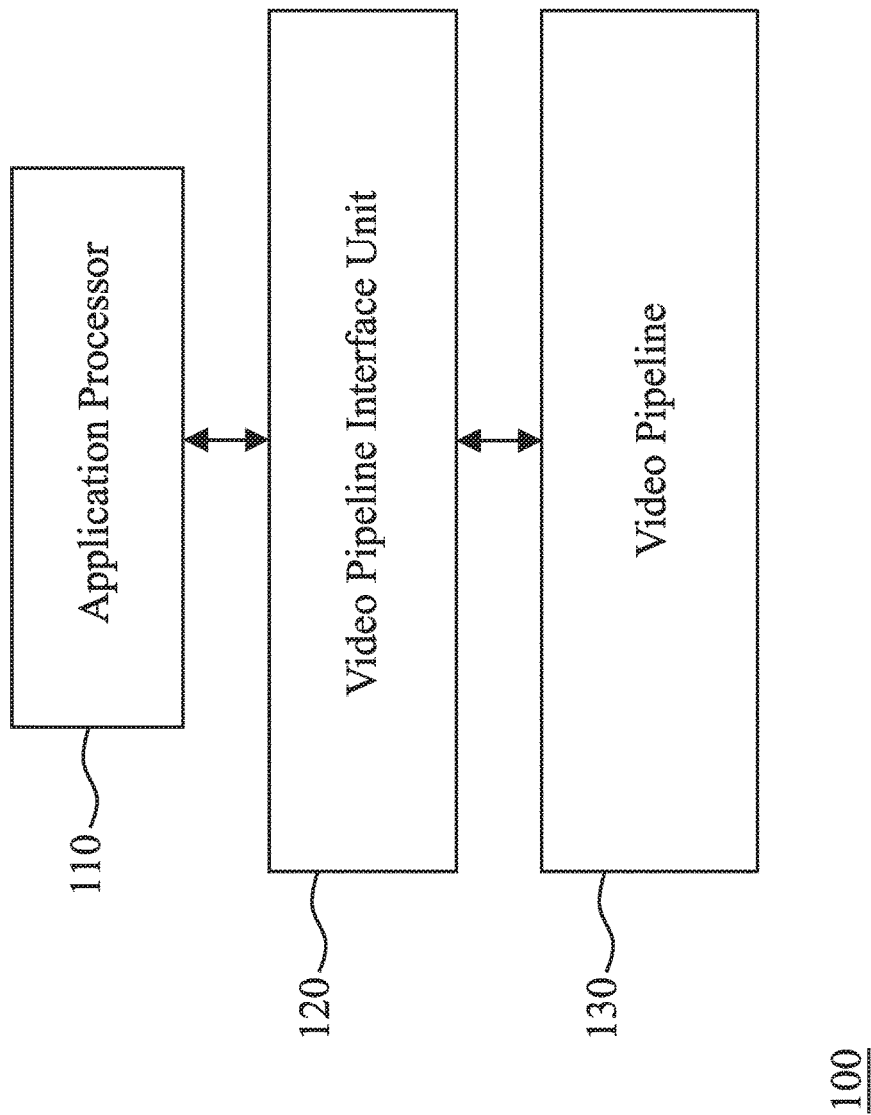
FIG. 1 illustrates an embodiment of the image processing device of the present disclosure.

Please refer to FIG. 1 which illustrates an embodiment of the image processing device of the present disclosure. The image processing device 100 of FIG. 1 is configured to process image raw data with an application processor 110 and a video pipeline 130 that is distinct from the application processor, and comprises the application processor 110, a video pipeline interface unit 120 and the video pipeline 130. The application processor 110 is operable to output at least a parameter and at least an instruction based on default or user setting to the video pipeline interface unit 120 between the application processor 110 and the video pipeline 130 through at least a transmission line such as a system bus.

Figure 2:
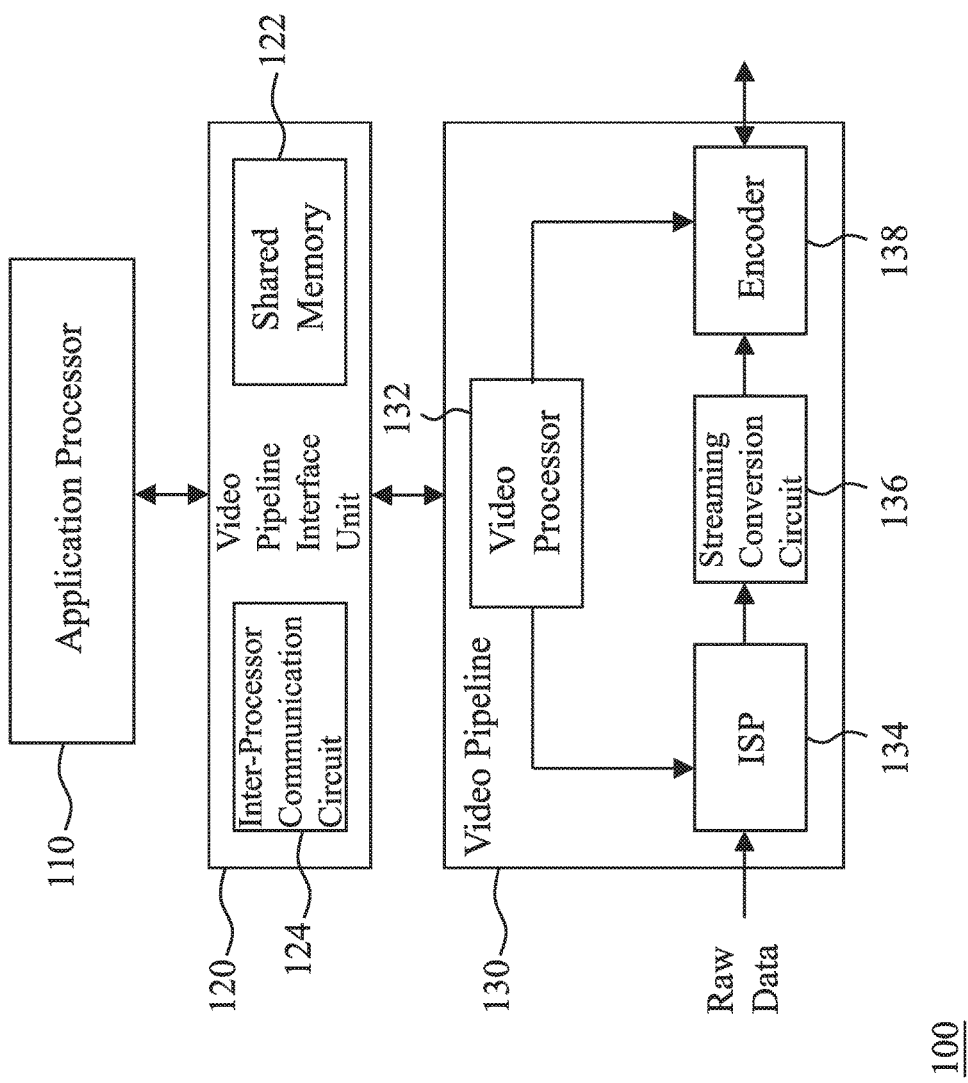
FIG. 2 illustrates an embodiment of the video pipeline of FIG. 1.

Please refer to FIG. 2. The video pipeline interface unit 120 includes: a shared memory 122 for storing the at least one parameter; and an inter-processor communication circuit 124 for passing the at least one instruction to the video processor 132 and reporting how the at least one instruction is treated by the video pipeline 130 to the application processor 110. In an embodiment of the inter-processor communication circuit 124, the application processor 110 and the video processor 132 send interrupts to each other for informing the other side of the availability information in the inter-processor communication circuit 124.

Please refer to FIG. 2. An embodiment of the video pipeline 130 includes: a video processor 132; an image signal processor (ISP) 134; a steaming conversion circuit 136; and an encoder 138. The video processor 132 is operable to output at least an image processing parameter and at least an encoding parameter according to one or both of the aforementioned at least one parameter and the at least one instruction. The ISP 134 is operable to generate video data in raster scan order according to the raw data input to the ISP 134. The streaming conversion circuit 136 is operable to convert a stream of the video data from the raster scan order to block based order. The encoder 138 is operable to generate encoded data according to the video data and the at least one encoding parameter.

The application processor 110 informs the video processor 132 about the requirements of processed video output and inform the start of video processing for a specified group of frames through the video pipeline interface unit 120.

The video processor 132 controls the ISP 134, streaming conversion circuit 136 and encoder 138 by every frame or/and at sub frame levels to perform video processing with its best effort to satisfy the requirements of the processed video output set by the application processor 110.

The video processor 132 informs the application processor 110 about the end of processing the said specified group of frames via the video pipeline interface unit 120.

The application processor 110 evaluates the information about the processed video output sequence, adjusts the requirements of the processed video output for the next group of frames and informs the video processor 132 about the start of video processing.

The application processor 110 uses the shared memory 122 to pass information about the requirements of the processed video output to the video processor 132. The video processor 132 uses the shared memory 122 to pass information about the processed video output to the application processor 110. The information and results of processing for the ISP 134 and the encoder 138 are saved in the shared memory 122, which enables information sharing between the ISP 134 and the encoder 138. Example of one such information is scene change detected by the ISP 134 and used by the encoder 138.

Figure 3:
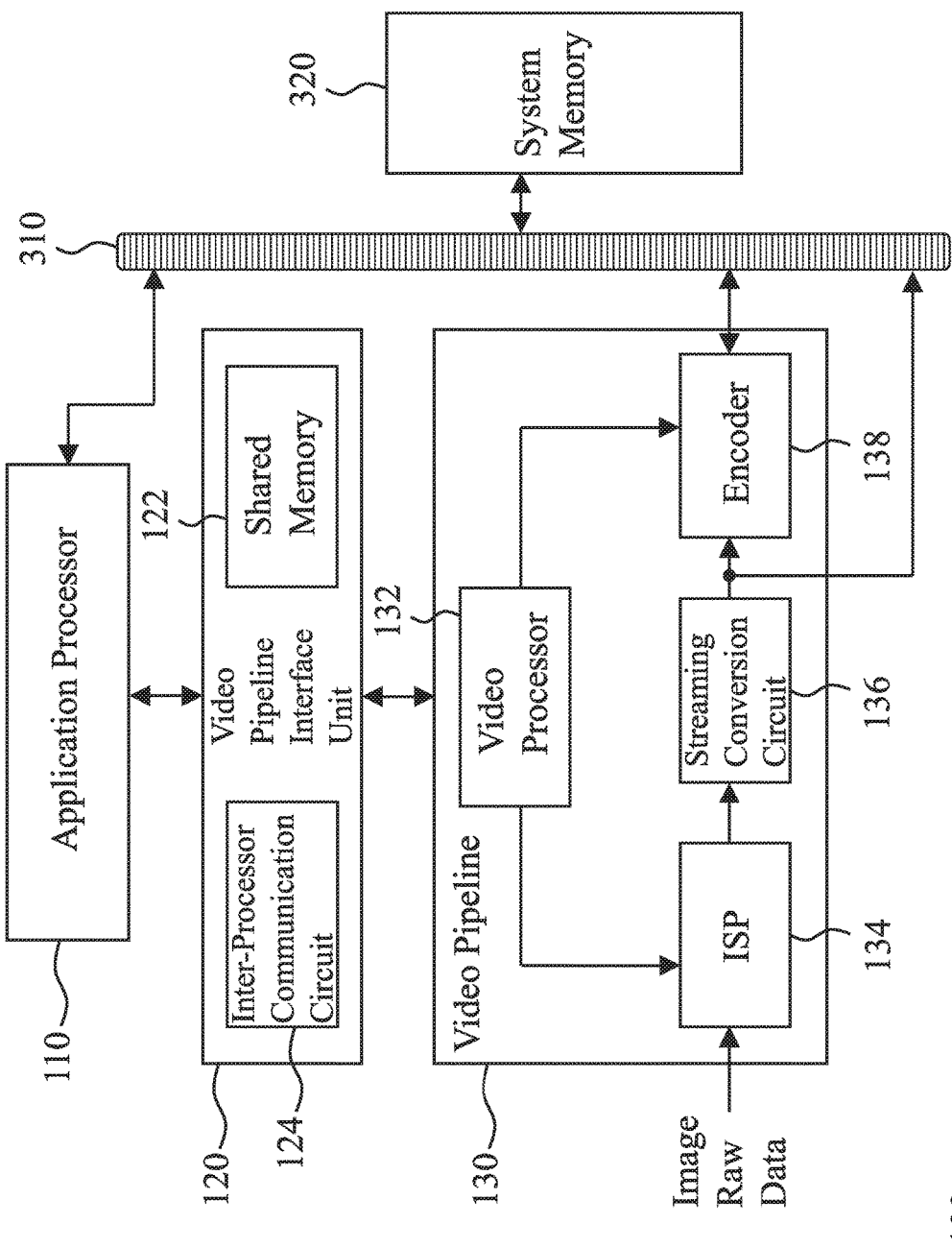
FIG. 3 illustrates another embodiment of the image processing device of the present disclosure.

On the basis of FIG. 1 and FIG. 2, an embodiment of the image processing device 100, as shown in FIG. 3, further includes a system bus 310 and a system memory 320.

Figure 4:
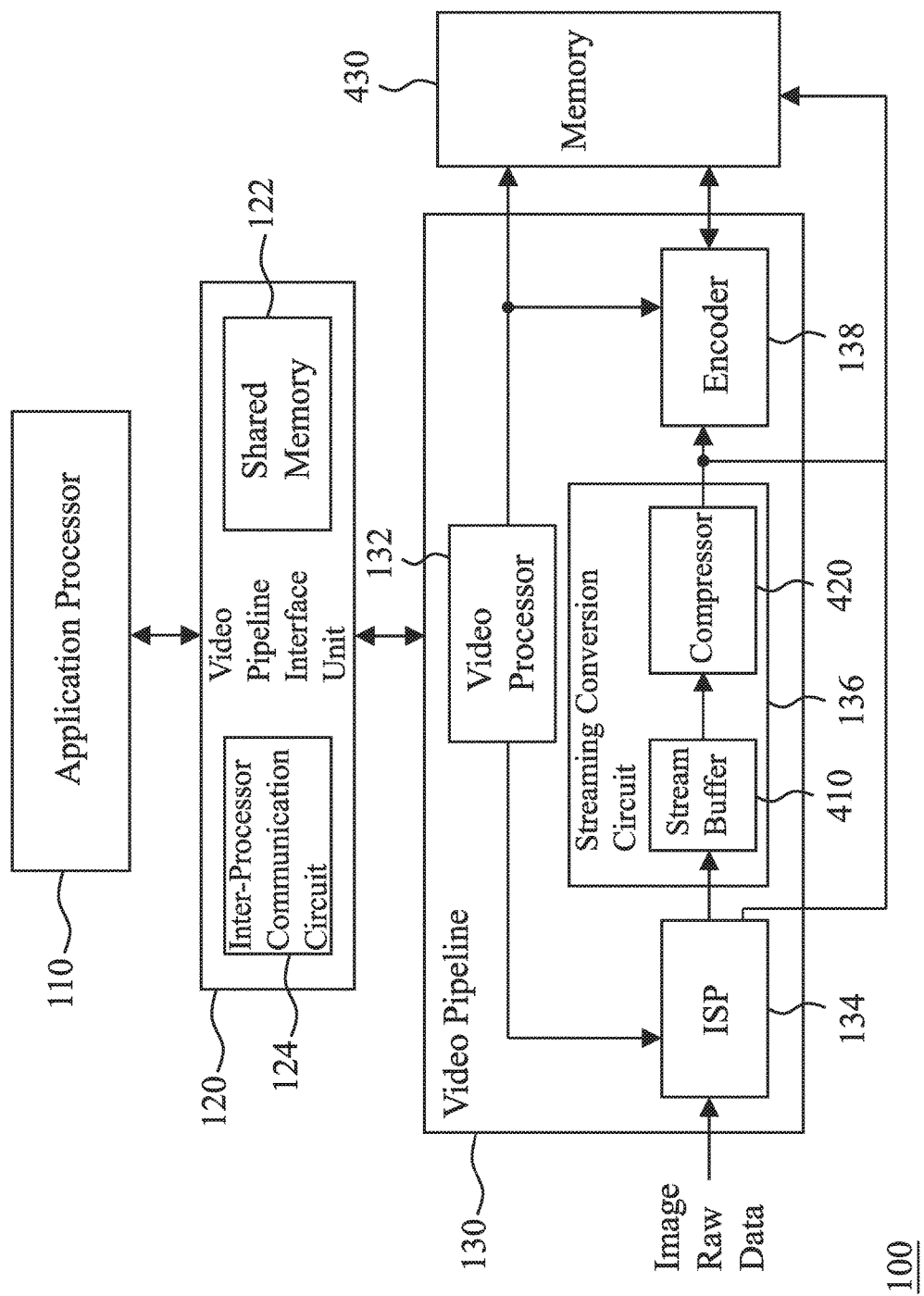
FIG. 4 illustrates a further embodiment of the image processing device of the present disclosure.

On the basis of FIG. 1 and FIG. 2, an embodiment of the streaming conversion circuit 136, as shown in FIG. 4, includes a stream buffer 410 and a block based compressor 420. The stream buffer 410 is operable to convert a stream of the video data from the raster scan order to the block based order. The streaming conversion circuit 136 can stream the video data in the block based order to the encoder 138. The block based compressor 420 can compress the block based video stream through reducing information redundancy within a block, that is to say through one or more of the following means: reducing coding redundancy, reducing interpixel redundancy and reducing psychovisual redundancy. The block based compressed video data is streamed to an external memory (e.g., the memory 430 in FIG. 4) for subsequent video processing while the compression reduces the bandwidth and size requirements of the external memory.

On the basis of FIG. 1 and FIG. 2, an embodiment of the image signal processor 134, as shown in FIG. 4, is further operable to generate images of multiple resolutions according to one image captured by an image capturing device. The lower resolution image among the images of multiple resolutions could be used or further processed for use of short-term storage, transmission, instant display, etc., while the higher resolution image among the images of multiple resolutions could be encoded and saved in permanent storage devices in the system or for other purposes. The ISP 134 could stream the lower resolution image (LR) to a system memory 430 directly in the raster scan order. The ISP 134 could stream the higher resolution image (HR) to the streaming conversion circuit 136 which generates the block based compressed video data stream and then subsequently streams the compressed video data stream to system memory 430. The ISP 134 could stream higher resolution image (HR) to the streaming conversion circuit 136 which streams the block based video data stream to the encoder 138. The encoder 138 will encode the block based video data stream into a bitstream conforming to a specific standard video compression specification and write the encoded elementary bitstream to the system memory 430.

The video processor 132 together with the encoder 138 are operable to encode video to a bitstream conforming to a standard video compression specification such as MJPEG, MPEG2, H.264, HEVC, VP8, VP9. In one embodiment, the video processor 132 encodes a bitstream header and write it to the memory 430 and the encoder 138 generates the elementary stream and write it to the memory 430. The said bitstream header and elementary bitstream are put together in sequence for forming an encoded bitstream conforming to the targeted standard video compression specification.

Figure 5:
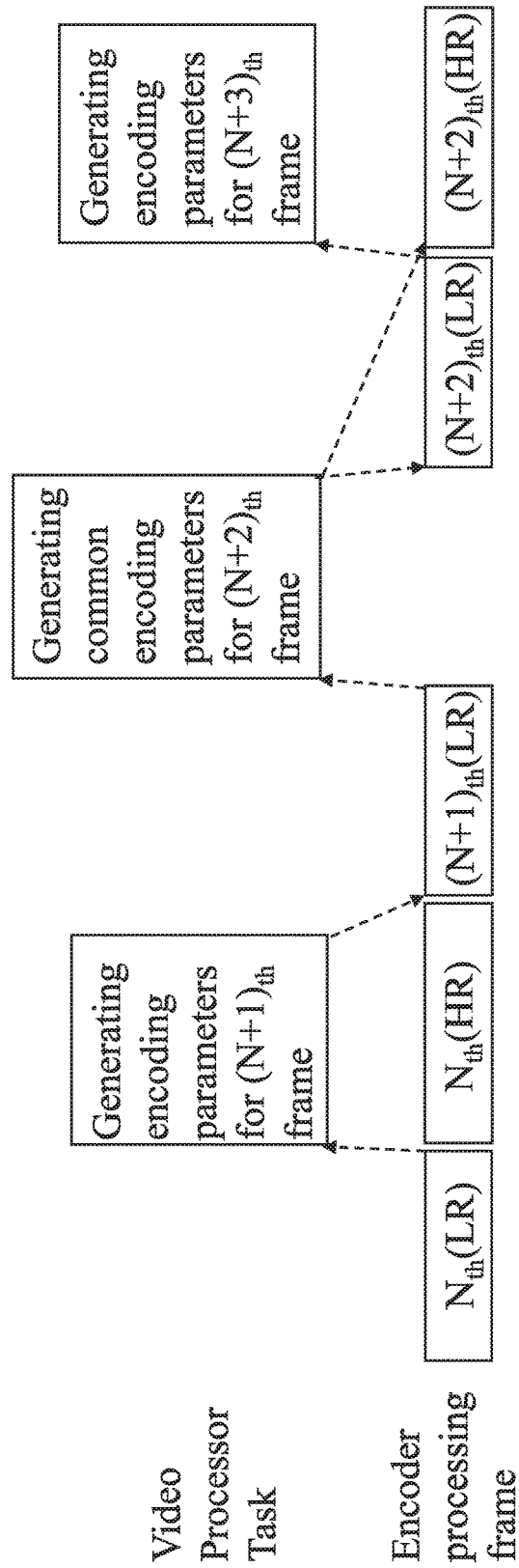
FIG. 5 illustrates an embodiment of how the video processor of FIG. 4 generates encoding parameters.

On the basis of FIGS. 1, 2 and 5, an embodiment of the video processor 132 is operable to generate encoding parameters for the encoder 138 to encode a lower resolution $(N+1)_{th}$ frame (labeled with "$(N+1)_{th}(LR)$" in FIG. 5), and operable to generate common encoding parameters for the encoder 138 to encode a lower resolution $(N+2)_{th}$ frame (labeled with "$(N+2)_{th}(LR)$" in FIG. 5) based on the encoding results of a lower resolution $(N+1)_{th}$ frame (labeled with "$(N+1)_{th}(LR)$" in FIG. 5); the said common encoding parameters could be reused for the encoding of a higher resolution $(N+2)_{th}$ frame (labeled with "$(N+2)_{th}(HR)$" in FIG. 5), and so on and so forth. Note that in addition to the said common encoding parameters which are used for the encoding of both the lower and higher resolution frames, the encoder 138 also needs different encoding parameters to complete the encoding of the lower and higher resolution frames respectively. Please also note that the dash lines in FIG. 5 indicate what basis (e.g., encoding results) is used for the video processor 132 and/or the encoder 138 executing tasks.

More specifically, the video processor 132 is operable to generate the encoding parameters during the period of the encoder 138 encoding a higher resolution $N_{th}$ image frame (labeled with "$N_{th}(HR)$" in FIG. 5), and operable to generate the common encoding parameters during the interval between the encoding of the lower resolution $(N+1)_{th}$ frame and the encoding of the lower resolution $(N+2)_{th}$ frame; afterwards, the common encoding parameters are used for the encoding of the lower resolution $(N+2)_{th}$ frame and the higher resolution $(N+2)_{th}$ frame, and so on and so forth. In brief, the video processor 132 is operable to generate certain common encoding parameters for the encoder 138 to encode both higher and lower resolution frames of the same image, which saves the video processor 132 the resources of computing encoding parameters.

Figure 6:
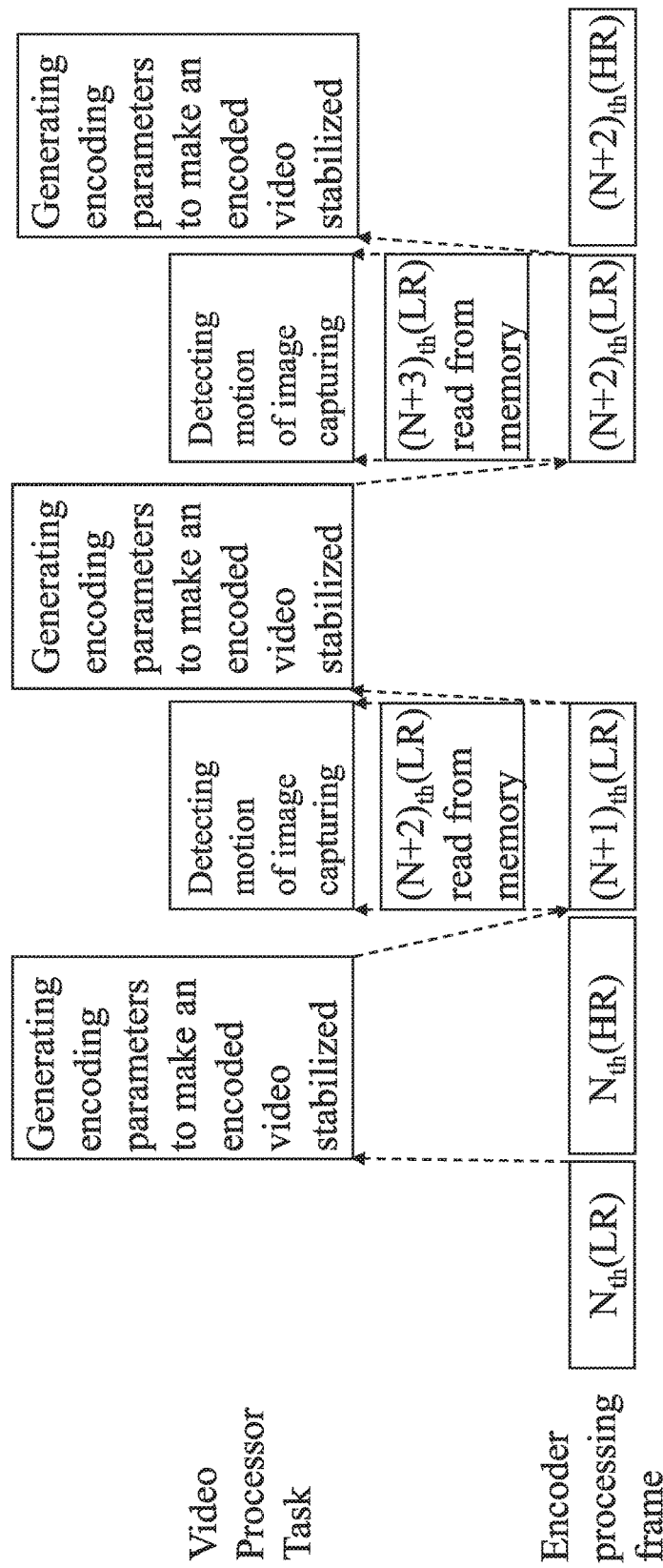
FIG. 6 illustrates an embodiment of how the video processor of FIG. 4 detects motion of image capturing between image frames.

On the basis of FIGS. 1, 2 and 6, an embodiment of the video processor 132 detects motion of image capturing between "$(N+2)_{th}(LR)$" and "$(N+1)_{th}(LR)$" frames, in which the $(N+2)_{th}(LR)$ frame and the $(N+1)_{th}(LR)$ frame are outputted by the ISP 134 in turn and stored in a memory (e.g., the memory 430 of FIG. 4) accessible by the video processor 132. The said detected motion is used to compute encoding parameters to make an encoded video stabilized by removing or minimizing the effect of motion of image capturing.

In another embodiment, the video processor 132 is assisted by hardware to speed up the detection of motion of image capturing. Since the two adjacent frames (e.g., $(N+2)_{th}(LR)$ frame and $(N+1)_{th}(LR)$ frame) are low resolution frames, it takes less effort for the video processor 132 to do analysis and generate encoding parameters to make an encoded video stabilized. After the generation of the encoding parameters, the encoder 138 is operable to encode both a lower resolution frame (e.g., $(N+2)_{th}(LR)$ frame) and a higher resolution frame (e.g., $(N+2)_{th}(HR)$ frame) by removing or minimizing the effect of motion of image capturing. Please note that each of the ordinal numbers such as $N_{th}$ and the like is the ordinal number of an image frame derived from the image capture sequence. Please also note that the dash lines in FIG. 6 indicate what basis (e.g., encoding results) is used for the video processor 132 and/or the encoder 138 executing tasks.

It should be noted that the aforementioned video pipeline interface unit 120 and the video pipeline 130 can constitute a video subsystem pertaining to a domain excluding the application processor 110. To be more specific, the video subsystem has less need to send an interrupt and/or a request to the application processor 110 for video processing because of the design and use of the video pipeline interface unit 120 and because the video processor 132 of the video pipeline 130 is a processor dedicated for video related software processing and control of the ISP 134 and encoder 138.

Figure 7:
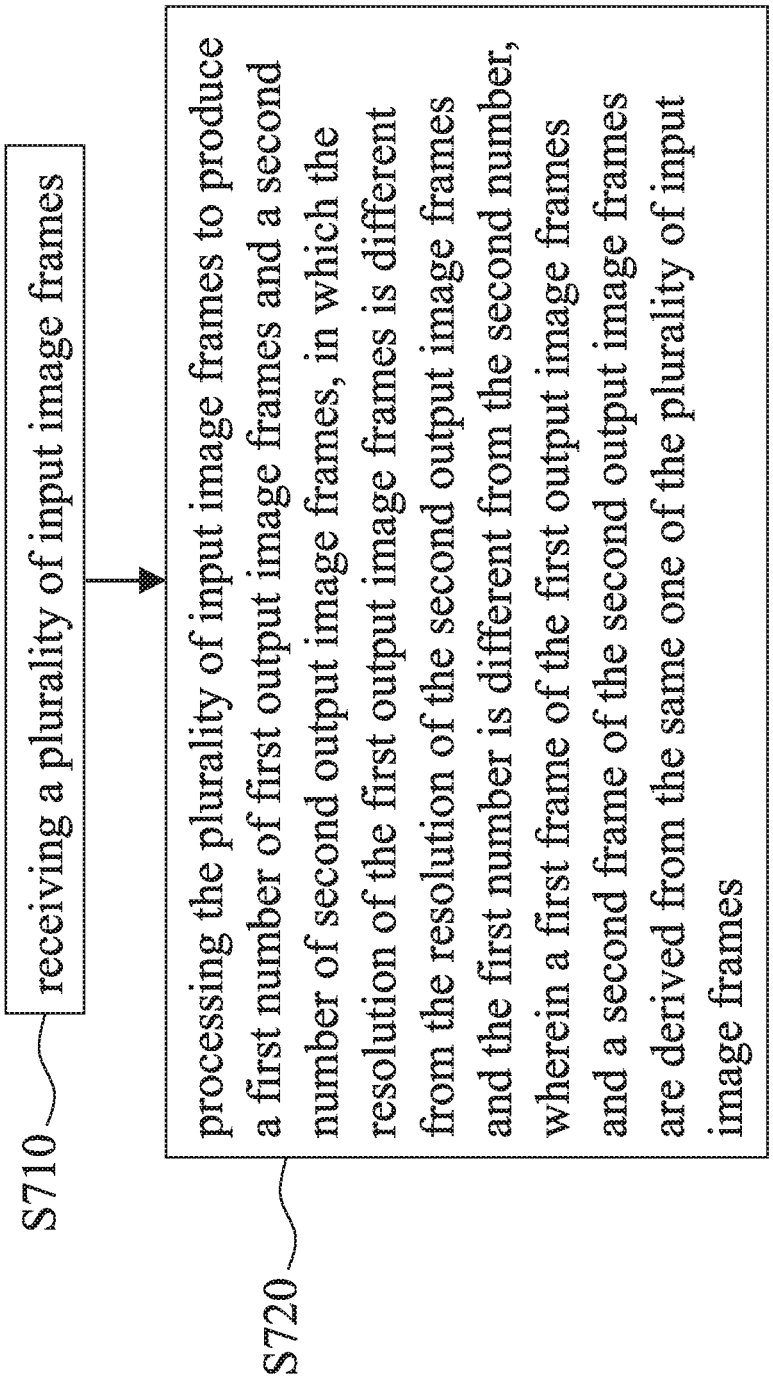
FIG. 7 illustrates an embodiment of the image frame processing method of the present disclosure.

The present disclosure also includes an image frame processing method for processing a plurality of input image frames with an image processing device. An embodiment of the method as shown in FIG. 7 comprises:

Step S710: receiving a plurality of input image frames; and

Step S720: processing the plurality of input image frames to produce a first number of first output image frames and a second number of second output image frames, in which the resolution of the first output image frames is different from (e.g., higher than) the resolution of the second output image frames and the first number is different from (e.g., less than) the second number, wherein a first frame of the first output image frames and a second frame of the second output image frames are derived from the same one of the plurality of input image frames.

In this embodiment, an image signal processor (e.g., the ISP 134 of FIG. 4) is operable to generate a plurality of image frames of different resolutions while these image frames are derived from one or more picture(s) captured by an image capturing device; for instance, the plurality of image frames include a first number of high resolution image frame(s) and a second number of low resolution image frame(s) while at least some of the high resolution image frame(s) and at least some of the low resolution image frame(s) are derived from the same picture captured by the image capturing device. In an exemplary implementation, the number of the input image frames is the same as the second number. In another exemplary implementation, the number of high resolution image frame(s) as shown in FIG. 5 is less than the number of low resolution image frames as shown in FIG. 5 while the data amount of the high resolution image frame(s) is the same as or close to the data amount of the low resolution image frames so that the data amount difference is generally not more than the data amount of one single high resolution image frame; in a preferred exemplary implementation, the first number is a half of the second number, and one of ordinary skill in the art can appreciate how to use other ratios of the first number to the second number instead. In a further exemplary implementation, the above-described method embodiment further comprises: detecting motion of image capturing between two adjacent frames of the second output image frames to output a motion detection result, in which the two adjacent frames include the second frame; and processing the first frame and the second frame according to the motion detection result. In a further exemplary implementation, the step of producing the first output frames comprises: producing a block based video stream according to the plurality of input frames; and compressing the block based video stream with a block based compression algorithm. In a further exemplary implementation, a first part of encoding parameters is generated for the encoding of the first and second frames during the encoding of a preceding frame of the first output image frames, wherein the preceding frame is encoded before the encoding of the first frame and the second frame. In a further exemplary implementation, the method embodiment further comprises: encoding the first frame of the first output image frames with a first part of encoding parameters and a second part of the encoding parameters and encoding the second frame of the second output image frames with the first part of the encoding parameters and a third part of the encoding parameters, in which the second part is different from the third part, wherein the first part of the encoding parameters is generated during the encoding of a preceding frame of the first output image frames, the preceding frame is encoded before the encoding of the first frame and the second frame, the first number is a half of the second number, the motion detection result is included in the first part of the encoding parameters, and the second frame is encoded before the encoding of the first frame; in addition, the method embodiment may further comprise: detecting motion of image capturing between two adjacent frames of the second output image frames to output a motion detection result, in which the two adjacent frames include the second frame; and processing the second frame according to the motion detection result.

Since those of ordinary skill in the art can appreciate the detail and modification of the above-described method embodiment by referring to the disclosure of the aforementioned device embodiments, which means that the features of the device embodiments can be applied to the method embodiment in a reasonable way, therefore repeated and redundant description is omitted provided that the written description and enablement requirements are still fulfilled.

Figure 8:
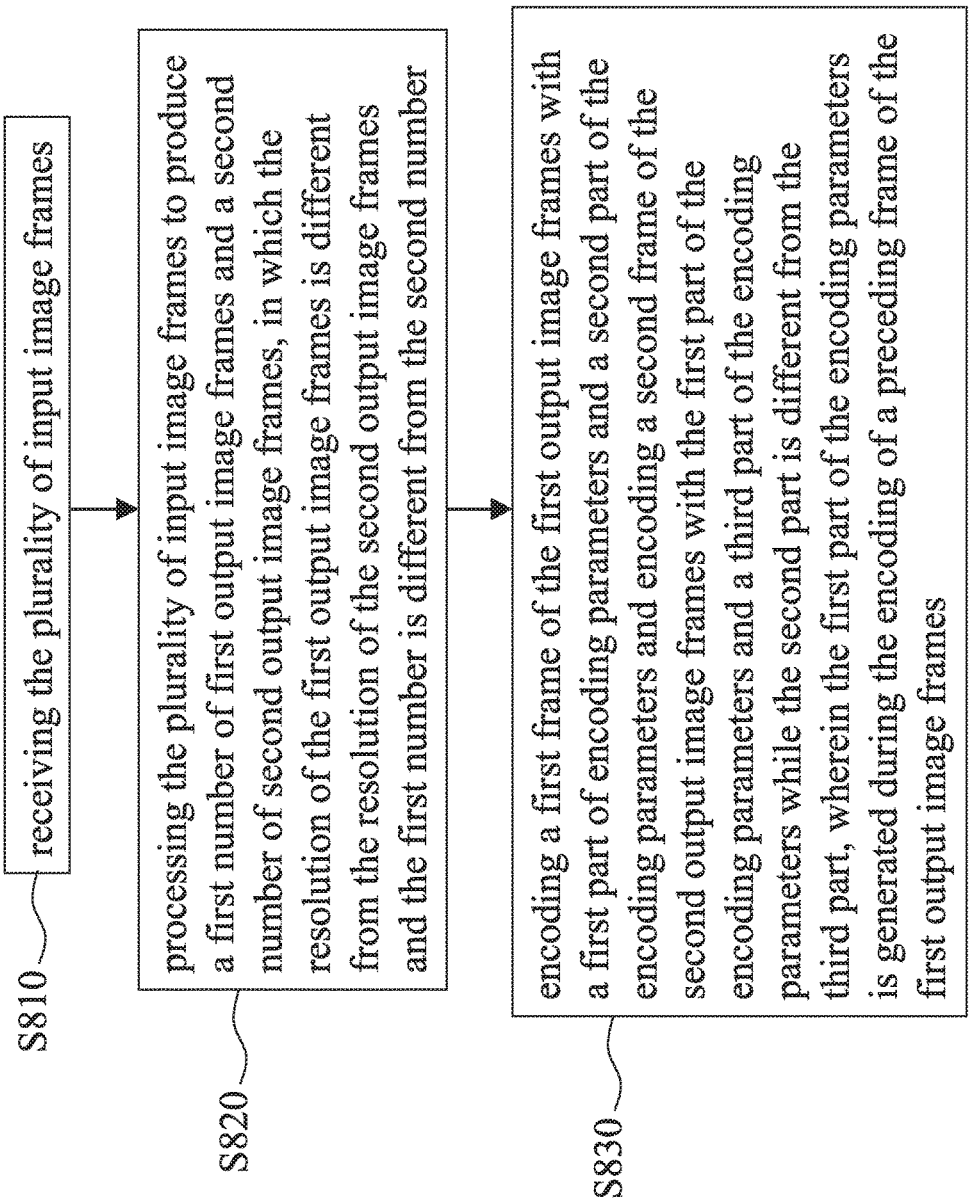
FIG. 8 illustrates another embodiment of the image frame processing method of the present disclosure.

The present disclosure further includes an image frame processing method for processing a plurality of input image frames with a video pipeline. An embodiment of the method as shown in FIG. 8 comprises:

Step S810: receiving the plurality of input image frames;

Step S820: processing the plurality of input image frames to produce a first number of first output image frames and a second number of second output image frames, in which the resolution of the first output image frames is different from (e.g., higher than) the resolution of the second output image frames and the first number is different from (e.g., less than) the second number; and Step S830: encoding a first frame of the first output image frames with a first part of encoding parameters and a second part of the encoding parameters and encoding a second frame of the second output image frames with the first part of the encoding parameters and a third part of the encoding parameters while the second part is different from the third part, wherein the first part of the encoding parameters is generated during the encoding of a preceding frame of the first output image frames.

In an exemplary implementation, the preceding frame is encoded before the encoding of the first frame and the second frame. In another exemplary implementation, the first number is a half of the second number. In a further exemplary implementation, the second frame is encoded before the encoding of the first frame. In a further exemplary implementation, the above-described method embodiment further comprises: detecting motion of image capturing between two adjacent frames of the second output image frames to output a motion detection result, in which the two adjacent frames include the second frame; and processing the first frame and the second frame according to the motion detection result, wherein the motion detection result is included in the first part of the encoding parameters.

Since those of ordinary skill in the art can appreciate the detail and modification of the above-described method embodiment by referring to the disclosure of the aforementioned device embodiments, which means that the features of the device embodiments can be applied to the method embodiment in a reasonable way, therefore repeated and redundant description is omitted provided that the written description and enablement requirements are still fulfilled.

In summary, the image processing device, video subsystem and video pipeline of the present disclosure reduce the need of sending interrupts to an application processor, use the certain common encoding parameter(s) for the encoding of lower and higher resolution frames, and detect motion of image capturing by using lower resolution frames, and generates encoding parameters for encoding both lower and higher resolution video by removing or minimizing the effects of image capturing motion so as to produce a stabilized video. Briefly, the image processing device, video subsystem and video pipeline of the present disclosure improve the performance of the photographic function, consume less resources of the application processor and enhance user experience.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An image frame processing method for processing a plurality of input image frames with an image processing device, comprising:
   receiving the plurality of input image frames; and
   processing the plurality of input image frames to produce a first number of first output image frames and a second number of second output image frames, in which the resolution of the first output image frames is different from the resolution of the second output image frames and the first number is different from the second number, wherein a first frame of the first output image frames and a second frame of the second output image frames are derived from the same one of the plurality of input image frames.

2. The image frame processing method of claim 1, wherein the number of the input image frames is the same as the second number.

3. The image frame processing method of claim 1, wherein the first number is less than the second number, and the resolution of the first output image frames is higher than the resolution of the second output image frames.

4. The image frame processing method of claim 3, wherein the first number is a half of the second number.

5. The image frame processing method of claim 1, further comprising:
    detecting motion of image capturing between two adjacent frames of the second output image frames to output a motion detection result, in which the two adjacent frames include the second frame; and
    processing the first frame and the second frame according to the motion detection result.

6. The image frame processing method of claim 1, wherein the step of producing the first output frames comprises:
    producing a block based video stream according to the plurality of input frames; and
    compressing the block based video stream with a block based compression algorithm.

7. The image frame processing method of claim 1, further comprising:
    encoding the first frame of the first output image frames with a first part of encoding parameters and a second part of the encoding parameters and encoding the second frame of the second output image frames with the first part of the encoding parameters and a third part of the encoding parameters, in which the second part is different from the third part.

8. The image frame processing method of claim 7, wherein the first part of the encoding parameters is generated during the encoding of a preceding frame of the first output image frames.

9. The image frame processing method of claim 8, wherein the preceding frame is encoded before the encoding of the first frame and the second frame.

10. The image frame processing method of claim 7, wherein the first number is a half of the second number.

11. The image frame processing method of claim 7, further comprising:
    detecting motion of image capturing between two adjacent frames of the second output image frames to output a motion detection result, in which the two adjacent frames include the second frame; and
    processing the second frame according to the motion detection result.

12. The image frame processing method of claim 11, wherein the motion detection result is included in the first part of the encoding parameters.

13. The image frame processing method of claim 7, wherein the second frame is encoded before the encoding of the first frame.

14. An image frame processing method for processing a plurality of input image frames with a video pipeline, comprising:
    receiving the plurality of input image frames;
    processing the plurality of input image frames to produce a first number of first output image frames and a second number of second output image frames, in which the resolution of the first output image frames is different from the resolution of the second output image frames and the first number is different from the second number; and
    encoding a first frame of the first output image frames with a first part of encoding parameters and a second part of the encoding parameters and encoding a second frame of the second output image frames with the first part of the encoding parameters and a third part of the encoding parameters, in which the second part is different from the third part,
    wherein the first part of the encoding parameters is generated during the encoding of a preceding frame of the first output image frames.

15. The image frame processing method of claim 14, wherein the preceding frame is encoded before the encoding of the first frame and the second frame.

16. The image frame processing method of claim 14, wherein the first number is less than the second number, and the resolution of the first output image frames is higher than the resolution of the second output image frames.

17. The image frame processing method of claim 16, wherein the first number is a half of the second number.

18. The image frame processing method of claim 14, further comprising:
    detecting motion of image capturing between two adjacent frames of the second output image frames to output a motion detection result, in which the two adjacent frames include the second frame; and
    processing the first frame and the second frame according to the motion detection result.

19. The image frame processing method of claim 18, wherein the motion detection result is included in the first part of the encoding parameters.

20. The image frame processing method of claim 14, wherein the second frame is encoded before the encoding of the first frame.

* * * * *